United States Patent [19]

Mucha et al.

[11] 4,145,723
[45] Mar. 20, 1979

[54] CONTROLLER FOR A NUMERICALLY-CONTROLLED FORM-CUTTING MACHINE

[75] Inventors: Horst Mucha; Wilhelm Arnoldi; Kurt Fattler, all of Aachen; Albrecht Overath, D Wurselen; Friedrich Halberschmidt, Herzogenrath; Heinz-Josef Reinmold; Josef Audi, both of Aachen, all of Fed. Rep. of Germany

[73] Assignee: Saint-Gobain Industries, France

[21] Appl. No.: 841,471

[22] Filed: Oct. 12, 1977

[30] Foreign Application Priority Data

Oct. 13, 1976 [DE] Fed. Rep. of Germany ....... 2646053

[51] Int. Cl.² .......................... G11B 31/00; B26D 5/30
[52] U.S. Cl. ......................................... 360/79; 83/879; 83/71
[58] Field of Search ................. 360/79; 83/71, 11, 12

[56] References Cited

U.S. PATENT DOCUMENTS

| | | | |
|---|---|---|---|
| 3,803,960 | 4/1974 | Pearl et al. | 83/71 |
| 3,848,490 | 11/1974 | Arel | 83/71 |

Primary Examiner—Robert S. Tupper
Attorney, Agent, or Firm—Pennie & Edmonds

[57] ABSTRACT

An electric control system for a numerically-controlled form-cutting machine is disclosed. The form-cutting machine has two drive motors for moving a cutting tool respectively in an X direction and a Y direction. The control system comprises X-channel and Y-channel program-encoding means for encoding a program for numerically controlling the motion of the cutting tool in the X and Y directions respectively. The control system further comprises a magnetic-tape unit, for example, a cassette recorder, which can record the encoded programs on two tracks of magnetic tape. The control system further comprises X-channel and Y-channel program-decoding means for converting the signals played back from the magnetic-tape unit into signals suitable for controlling the motion of the cutting tool. The control system also includes conductive means interconnecting the components of the system.

5 Claims, 3 Drawing Figures

CONTROLLER FOR A NUMERICALLY-CONTROLLED FORM-CUTTING MACHINE

BACKGROUND OF THE INVENTION

1. Field of the Invention

The invention relates to an electric control circuit for a cross-slide cutting machine for glass panes having separate drive motors for the X- and Y-axes of the cross slide. The contour to be cut on a glass pane is determined by signals stored on a magnetic tape.

2. Description of the Prior Art

A numerically controlled glass-cutting machine having separate drive motors for motion the X and Y directions is described in West German Auslegeschrift No. 15 96 389, for example. Each of the two cross-slide drive motors must be subject to control in both directions of rotation. For this reason, magnetic-tape control units for such machines have heretofore been provided with two tracks on the magnetic tape for each of the drive motors, with the control pulses for one direction of rotation stored on one track and those for the other direction of rotation on the other track. This means that a tape for such a control unit must have at least four tracks altogether in order to have full control of both motors. Moreover, since another magnetic tape track is almost always required for the storage of important supplementary information, such as the beginning and end of a program, five tracks have been generally required together on prior-art tape-controlled machines. To take full advantage of a magnetic tape-controlled glass cutting machine, one must be able to substitute one program for another quickly. This can most readily be done with the models on the market today which employ tape cassettes. It is, however, extremely difficult, and hence practically impossible, to provide tape cassette machines with recording, erasing, and playback heads for each of five tracks. Furthermore, the tape of ordinary tape cassettes is too narrow to permit the recording of five tracks.

The basic problem of the invention is then to create a control circuit for a glass-cutting machine controlled along the X and Y-axes simultaneously by a program stored on magnetic tape, the circuit requiring fewer than five tape tracks, so that a cassette and cassette player of the types readily obtainable on the market can be used as a storage device for the cutting program of the glass-cutting machine.

SUMMARY OF THE INVENTION

In accordance with a first embodiment of the invention, this problem is solved by an electronic circuit for encoding a cutting program suitable for storage on magnetic tape and for decoding the cutting program as it is read from the tape. Broadly, the circuit includes a program-encoding stage which encodes position-increment pulses coming from a shaft-encoding pulse generator coupled to a rotatable shaft, the pulses being encoded in a form in which they are differentiated in accordance with the direction of revolution of the shaft yet can be stored on one and the same magnetic tape track. The circuit also includes a program-decoding stage which detects the encoded pulse signals coming from the tape track as the program is played back and routes them into one of two output channels, a first output channel for controlling the forward movement of a drive motor for one axis of the glass-cutting machine and a second output channel for controlling the reverse movement of the drive motor.

According to a second embodiment and a third embodiment of the invention, the basic problem of the invention is solved by an electronic circuit characterized in that the position-increment pulses for the forward and reverse movements of a drive motor for one axis of a glass-cutting machine are stored on a single tape track in the form of homogeneous pulses, two tape tracks thereby storing sequences of position-increment pulses for the X and Y-axes respectively. These embodiments are further characterized in that supplementary information about the direction or sign of rotation corresponding to the position increment pulses are superimposed on these direction impulses in the case of the second embodiment, or, in the case of the third embodiment, recorded separately on a third magnetic tape track. The supplementary information can be recorded in the form of pulsed audio-frequency signals coordinated with the homogeneous pulses.

Thus, with a control system designed according to the invention, only three or, in the case of the third embodiment, a maximum of four tape tracks are required for the complete program of one pattern cutting in an X and Y plane.

Thus widely available types of cassettes and recorders can be used for the first time for controlling numerically-controlled glass-cutting machines, affording the advantage of simplicity in changing cutting patterns. This can result in a considerable savings in time if many short series of different forms occur in the manufacturing process, making frequent changes of cutting patterns necessary.

One embodiment of the program-decoding stage of the invention is characterized in that the encoded pulse signals stored on the tape track are converted during playback into signals made up of pairs of wave halves, one positive and the other negative. Each such pair begins with either a positive or a negative half depending on the direction of rotation. The embodiment is further characterized in that wave halves that come in immediate succession and have the same sign are detected, which permits the signals to be in effect routed into the forward or reverse output channel as required.

The new circuit can be implemented very successfully with components already known in the field of digital engineering. Such a logic circuit for detecting the direction of a rotation is also a subject of the invention.

BRIEF DESCRIPTION OF THE DRAWINGS

What follows is a more detailed description of a preferred embodiment of the invention, using the following drawings as an aid.

DETAILED DESCRIPTION OF PREFERRED EMBODIMENTS

Figure 1:
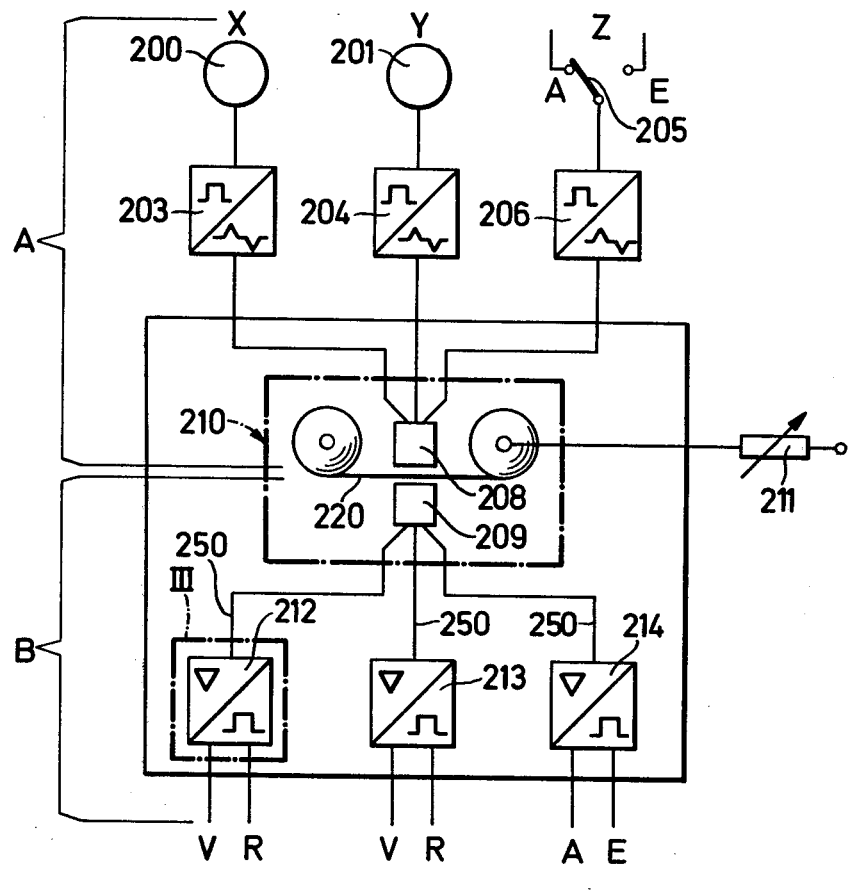
FIG. 1, consisting of A and B, is a schematic block diagram of a magnetic-tape storage circuit with the components required for the encoding and decoding of cutting programs.

FIG. 1 is a block diagram of a magnetic-tape storage circuit, including both recording and playback components, for the control of a numerically-controlled form-cutting machine. The form-cutting machine has two drive motors, an X-direction drive motor for moving a cutting tool in an X direction and a Y-direction drive motor for moving the cutting tool in a Y direction. The machine can be used for cutting panes of glass.

Broadly, the storage circuit comprises a recording section A, which encodes position-increment pulses generated by two shaft-encoding pulse generators 200 and 201 corresponding to two axes denoted X and Y, which correspond to the X and Y directions, into signals that indicate the direction of rotation and stores the encoded signals on magnetic tape 220. The storage circuit further comprises a playback section B, which decodes the signals by means of appropriate discriminator circuits 212, 213, and 214 into signals that can be used to control the X and Y-direction drive motors of the cutting machine.

The cutting machine itself can be used to generate the cutting program. Its cutting head, mounted on a cross slide, is guided along whatever contour it is desired to store. An X-axis shaft-encoding pulse generator 200 is mounted securely on an axis of a drive shaft for the X-direction of the cross slide. Similarly, a Y-axis shaft-encoding pulse generator 201 is coupled on an axis of a drive shaft for the Y direction. Each of the two shaft-encoding pulse generators 200 and 201 includes a slotted diaphragm fixed to the coupling shaft, with two photoelectric cells mounted next to each other behind it. The distance between the two photoelectric cells and the dimensions of the slotted diaphragm are selected to cause the signals from the two photo-electric cells to have a phase shift of about 90 degrees relative to one another. The pulses from the two photoelectric cells are converted into rectangular pulses in two corresponding trigger stages. The rectangular pulses at the outputs of the two trigger stages are delayed with respect to one another corresponding to the phase shift. A subsequent electronic circuit detects which of the two phase-shifted signals is the first one to appear, which indicates the direction in which the drive shaft is rotating. Signals corresponding to the two directions of rotation are separated from each other and routed to one of two outputs, a first output carrying only the pulses that represent an increment of rotation in the forward direction and a second output only those that represent an increment of rotation in the reverse direction. The signals are detected and separated by means of a logic circuit. This type of transmitter is produced and distributed by GELMA (Gesellschaft für Elektro-Feinmechanik mbH: "Corporation for Electronic Precision Mechanics, Ltd.") under the name "Rotations-Impulsegeber" ("Rotation-pulse transmitter").

The output of the X-axis shaft-encoding pulse generator 200 which corresponds to an increment of rotation in the forward direction is connected to a first input terminal of an X-channel signal encoding circuit 203, and the output of the X-axis shaft-encoding pulse generator 200 which corresponds to an increment of rotation in the reverse direction is connected to a second input terminal of the X-channel signal-encoding circuit 203. The signal-encoding circuit 203 generates a positive-going triangle pulse at its output terminal when a pulse is applied to its first input terminal and a negative-going triangle pulse at the same output terminal when a pulse is applied to its second input terminal. Circuits for accomplishing this conversion are widely known among those skilled in the art and for conciseness will not be described here. The output terminal of the X-channel signal-encoding circuit 203 is connected to an X-channel input terminal of a magnetic-tape unit 210.

Similarly, the two outputs of the Y-axis shaft-encoding pulse generator 201 corresponding to the two directions of rotation are connected to a first and second input terminal of a Y-channel signal encoding circuit 204, whose output terminal is in turn connected to a Y-channel input terminal of the magnetic-tape unit 210. Supplementary signals in a third channel, Z, generated, for example, by a switch 205, can also be similarly processed in a Z-channel signal encoding circuit 206 and applied to a Z-channel input terminal of the magnetic tape unit 210.

The X, Y, and Z-channel input terminals of the magnetic tape unit 210 are connected to a schematically-drawn three-track recording head 208; signals at each input being recorded on separate tracks, as shown in FIG. 2a. The magnetic tape unit 210 is preferably a cassette machine with three recording and playback channels denoted X, Y, and Z, which record and read from three tracks on the magnetic tape respectively denoted $S_X$, $S_Y$, and $S_Z$. In operation, the $S_X$ track contains forward and reverse signals for controlling the X-axis drive motor, the $S_Y$ track contains forward and reverse signals for controlling the Y-axis drive motor, and the $S_Z$ track contains supplementary information, such as that indicating the beginning and end of a cutting program. The magnetic tape unit 210 also includes a variable speed control 211 for changing the speed of the tape transport in playback and recording.

To record a cutting program for a particular desired curve, the magnetic tape transport is set to run at its lowest speed. The cross slide of the glass cutting machine is used to trace the desired contour. The cross slide ordinarily should not go any faster than about 6 m/min if the contour is to be accurately traced, whether by hand or with a conventional photo-electric curve tracer. When the tape is played back, the machine can be run at a considerably higher speed, of course.

The triangle signals stored on the tape can be picked up by a three-track playback head 209. Such a magnetic tape playback head in effect recovers the mathematical derivative of the signal stored on the tape. Thus, when they leave the tape machine, the signals are in the form of oscillations with positive and negative wave halves, as may be seen from FIG. 2b. For each positive triangle pulse there is a corresponding signal made up of a pair of wave halves that begins with a positive wave half, and for each negative triangle pulse there is a corresponding signal that begins with a negative wave half.

The magnetic tape unit 210 has three output terminals at which signals recorded on the three tracks of the tape appear. The three outputs are individually connected to three signal discriminator circuits 212, 213, and 214, described in detail below. Each discriminator circuit has a V output terminal and an R output terminal. When a signal corresponding to an increment of rotation in the forward direction is applied to the input of a discriminator circuit, the circuit generates a pulse at its V output. Similarly, a signal corresponding to an increment of rotation in the reverse direction applied to the input of a signal-decoder circuit results in a pulse appearing at the R output. The signals at the outputs V and R directly supply the voltage pulses for controlling the drive motors of the cross slide.

FIG. 2a shows a section of magnetic tape 220, with triangle signals 222 and 223 recorded on its three tracks, $S_X$, $S_Y$, and $S_Z$. The positive triangle signals 222, with their apexes pointing up, represent an increment of revolution in the forward direction of a pulse transmitter, while the negative triangle signals 223, with their apexes pointing down, signify an increment of revolution in the opposite direction. Each positive triangle signal produces a voltage signal at an output of the tape unit 210 that begins with a positive wave half, and each negative triangle signal produces a voltage signal that begins with a negative wave half. FIG. 2b shows the sequence of voltage signals at an X-channel output which correspond to the triangle signals on track $S_X$ of the tape shown in FIG. 2a.

When positive triangle pulses follow one another without interruption on a tape track, the detected voltage signals 226, which begin with a positive half wave, also appear without interruption at the corresponding output of the tape recorder. In this case, the corresponding signal discriminator circuit will transmit position increment pulses for forward motion of the drive motor from output V. If the polarity of the triangle pulses changes from positive to negative, a signal 228, which begins with a negative wave half, will appear at the corresponding output of the tape recorder. Since the second wave half of the signal 226' immediately preceding was also negative, two wave halves of the same sign will appear in immediate succession. When two wave halves with the same sign appear in immediate succession at the X or Y output of the magnetic tape unit 210 it always corresponds to a change in the direction of rotation of a drive motor. Such a change in direction of rotation is detected in the discriminator circuits 212 and 213.

As the schematic diagram in FIG. 2c shows, rectangular control pulses 230 are produced at the output V of a discriminator circuit when the corresponding triangle signals on the magnetic tape are positive, and rectangular control pulses 232 are produced at the output R when the triangle signals are negative. The discriminator circuits are provided with a trigger stage, so that only the signals which have amplitudes lying above a trigger threshold voltage TS are processed, thereby reducing the influence of interference signals.

Figure 3:
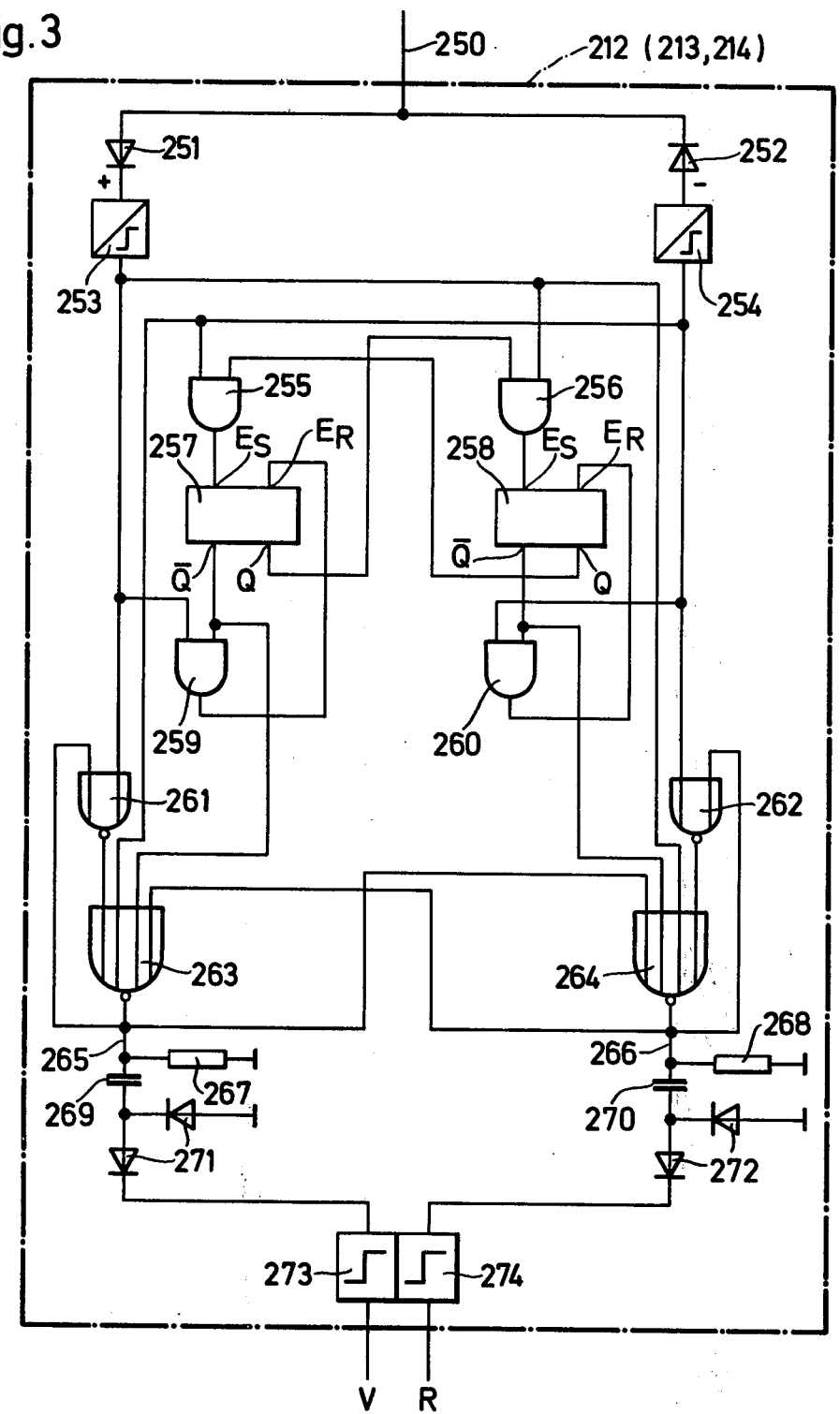
FIG. 3 is a schematic diagram of a logic circuit for decoding the encoded signals played back from the magnetic tape.

The design of the discriminator circuit 212 for the X channel will be described in greater detail with the aid of FIG. 3. Signal discriminator circuits 213 and 214 are identical to circuit 212.

The discriminator circuit 212 is a symmetrical logic circuit which in effect routes the signals that come by way of lead 250 from one track of the magnetic tape playback head 209 into one of two channels, of which one controls forward movement and the other reverse. The circuit comprises two diode rectifiers, 251 and 252, which divide the positive wave halves from the negative, followed by two trigger circuits, 253 and 254, a logic circuit formed by AND gates 255, 256, 259, and 260, NOR gates 261, 262, 263, and 264, and two storage flip-flops, 257 and 258. Connected to the outputs of each of these logic circuits is a differentiator composed of discharge resistances 267 and 268, capacitors 269 and 270, and diodes 271 and 272. The outputs of the differentiators are connected to two monostable multivibrators 273 and 274, which supply control pulses wide enough to be processed in the circuit for controlling the X-axis drive motor. The individual components of this stage are all commercially available.

In what follows, the two signals that occur at the inputs and outputs of the gates and the flip-flops will be denoted L (for "low") and H (for "high"). The storage flip-flops, 257 and 258, are of the R-S type, having a set input $E_S$, a reset input $E_R$, an output Q, and a complementary output $\bar{Q}$. An example of a suitable storage flip-flop is the R-S flip-flop designated part "1S 11" of the series "Logistat 1" manufactured by "AEG." Output $\bar{Q}$ has signal H when output Q shows signal L, and vice versa. The set and reset inputs on such storage flip-flops only function if the H signal is converted to an L signal. If set input $E_S$ has signal H and reset input $E_R$ has signal L, then signal H appears at output $\bar{Q}$. Signal H remains at output $\bar{Q}$ until reset input $E_R$ receives signal H.

The differentiators that consist of resistances 267 and 268, capacitors 269 and 270, and diodes 271 and 272, deliver a short pulse when an H signal appears at their inputs. This short pulse is transmitted to the connected monostable multivibrators 273 and 274, which convert them to rectangular pulses with sufficient width, 200, $\mu s$, for example.

The discriminator circuit 212 operates as follows. The signals that come from the appropriate output of the tape recorder over line 250 which consist of a positive and a negative wave half enter diode rectifiers 251 and 252. The rectifier 251 permits the positive wave halves to pass to the trigger stage 253. Similarly, the rectifier 252 permits the negative wave halves to pass to the trigger stage 254. The trigger stages convert the wave halves into rectangular signals of H voltage.

When a signal that begins with a positive wave half and is followed by a negative wave half arrives over line 250, then, if there is an H signal at the output Q of flip-flop 257, both inputs of the AND gate 256 receive the H signal. Consequently, both the output of AND gate 256 and therefore the set input $E_S$ of flip-flop 258 also show the H signal. Consequently, output $\bar{Q}$ of flip-flop 258 receives signal H. This closes NOR gate 264. At the same time, NOR gate 261 receives signal H from trigger stage 253, which causes it to open the output of NOR gate 263 if all the inputs of NOR gate 263 show an L signal, as is the case for the momentary state under discussion. Signal H appears at the input of differentiator links 267, 269, and 271 in consequence. This H signal is converted into a signal useable by the drive motor by passing through the differentiator, monostable multivibrator 273, and then out through output terminal V.

When the positive wave half that had the effect described above is followed by a negative wave half, then, since there is an H signal at both inputs $E_S$ and $E_R$, storage flip-flop 258 is released through AND gate 260, so that output Q of flip-flop 258 also shows the H signal. The H signal from output Q of flip-flop 258 then works in reverse by way of AND gate 255 on flip-flop 257, which is thus prepared for the next step.

If, however, not a negative, but another positive wave half follows the positive wave half, with the results that then ensue storage flip-flop 258 is not set. Since storage flip-flop 257 is also not set, meaning that there is an L signal at output Q of this flip-flop, NOR gate 263 will also be closed by NOR gate 261, and the H signal will now appear at output 266 of NOR gate 264. Consequently, output R now generates a rectangular pulse by way of differentiator 268, 270, and 272 and monostable multivibrator 274, and this pulse causes the motor to rotate one increment in reverse.

The processes described above repeat themselves with the control pulses appearing at the same output terminal until two wave halves of the same sign come in immediate succession, causing the previously open branch to close and the previously closed branch to open, which will reverse the rotation of the motor.

We claim:

1. An electric control system for a numerically controlled form-cutting machine having two drive motors, an X-direction drive motor for moving a cutting tool in an X direction and a Y-direction drive motor for moving the cutting tool in a Y direction, the control system comprising:
   (a) X-channel program-encoding means having a forward-increment input terminal, a reverse-increment input terminal, and an encoded-signal output terminal for receiving first pulsed signals at its forward-increment input terminal and second pulsed signals at its reverse-increment input terminal, converting the first and second pulsed signals into first and second encoded pulsed signals respectively, the wave form of the first encoded pulsed signal differing from the wave form of the second encoded pulsed signal, and transmitting the encoded pulsed signals from the encoded-signal output terminal;
   (b) Y-channel program-encoding means having a forward-increment input terminal, a reverse-increment input terminal, and an encoded-signal output terminal for receiving first pulsed signals at its forward-increment input terminal and second pulsed signals at its reverse-increment input terminal, converting the first and second pulsed signals into first and second encoded pulsed signals respectively, the wave form of the first encoded pulsed signal differing from the wave form of the second encoded pulsed signal, and transmitting the encoded pulsed signals from the encoded-signal output terminal;
   (c) a magnetic tape unit having a magnetic tape transport, a first recording/playback channel, and a second recording/playback channel, each recording/playback channel including a recording input terminal and a playback output terminal and being adapted to record a signal applied to the recording input terminal on a single track of magnetic tape and to transmit a signal from the playback output terminal corresponding to the signal recorded on the track of magnetic tape;
   (d) conductive means connecting the encoded-signal output terminal of the X-channel program-encoding means to the recording input terminal of the first recording/playback channel of the magnetic tape unit;
   (e) conductive means connecting the encoded-signal output terminal of the Y-channel program-encoding means to the recording input terminal of the second recording/playback channel of the magnetic tape unit;
   (f) X-channel program-decoding means having a program-playback-signal input terminal, a forward-increment output terminal, and a reverse-increment output terminal for receiving an encoded pulsed playback signal at its program-playback-signal input terminal, processing the encoded pulsed playback signal to discriminate between playback wave forms derived from the first and the second encoded pulsed signal of section (a), and transmitting a drive-motor-control pulsed signal from the forward-increment output terminal or the reverse-increment output terminal in accordance with the outcome of the discrimination processing;
   (g) conductive means connecting the playback output terminal of the first recording/playback channel of the magnetic tape unit to the program-playback-signal input terminal of the X-channel program-decoding means;
   (h) Y-channel program-decoding means having a program-playback-signal input terminal, a forward-increment output terminal, and a reverse-increment output terminal for receiving an encoded pulsed playback signal at its program-playback-signal input terminal, processing the encoded pulsed playback signal to discriminate between playback wave forms derived from the first and the second encoded pulsed signal of section (b) and transmitting a drive-motor-control pulsed signal from the forward-increment output terminal or the reverse-increment output terminal in accordance with the outcome of the discrimination processing; and
   (i) conductive means connecting the playback output terminal of the second recording/playback channel of the magnetic tape unit to the program-playback signal input terminal of the Y-channel program-decoding means.

2. The apparatus according to claim 1 in which:
   (i) each program-encoding means is adapted to produce first and second encoded pulsed signals having first and second wave forms respectively such that the encoded pulsed playback signals derived from the encoded pulsed signals by the magnetic tape unit are made up of a positive wave half and a negative wave half, the positive wave half preceding the negative wave half for the encoded pulsed playback signal derived from one wave form and the negative wave half preceding the positive wave half for the encoded pulsed playback signal derived from the other wave form; and
   (ii) each program-decoding means is adapted to detect pairs of wave halves having the same polarity and occurring in immediate succession, thereby discriminating between playback wave forms derived from the first and the second encoded pulsed signals.

3. The apparatus according to claim 2 in which each program-decoding means comprises:
   (a) a first diode-rectifier/trigger circuit having a signal input and a logic-pulse output, the signal input being connected to the program-playback-signal input terminal of the program decoding means, the first diode-rectifier/trigger circuit being capable of producing a logic signal at its logic-pulse output in response to a positive wave form applied to its signal input;
   (b) a second diode-rectifier/trigger circuit having a signal input and a logic-pulse output, the signal input being connected to the program-playback-signal input terminal of the program decoding means, the second diode-rectifier/trigger circuit being capable of producing a logic signal at its logic-pulse output in response to a negative wave form applied to its signal input;

(c) a first, a second, a third and a fourth AND gate, each AND gate having a first and a second input and an output, the first input of the first AND gate and the first input of the third AND gate being connected to the logic-pulse output of the first diode-rectifier/trigger circuit, and the first input of the second AND gate and the first input of the fourth AND gate being connected to the logic-pulse output of the second diode-rectifier/trigger circuit;

(d) a first and a second R-S flip-flop, each flip-flop having a set input, a reset input, a Q output, and a complementary $\bar{Q}$ output, the set and the reset inputs of the first flip-flop being connected respectively to the outputs of the fourth and the first AND gates, the Q and the $\bar{Q}$ outputs of the first flip-flop being connected respectively to the second input of the third AND gate and the second input of the first AND gate, the set and reset inputs of the second flip-flop being connected respectively to the outputs of the third and the second AND gates, and the Q and the $\bar{Q}$ outputs of the second flip-flop being connected respectively to the second input of the fourth AND gate and the second input of the second AND gate;

(e) a first and a second NOR gate, each of said NOR gates having a first and second input and an output, the first input of the first NOR gate being connected to the logic pulse output of the first diode-rectifier/trigger circuit, and the first input of the second NOR gate being connected to the logic-pulse output of the second diode-rectifier/trigger circuit;

(f) a third and a fourth NOR gate, each of said NOR gates having an output and a first, a second, a third, and fourth input, the first input of the third NOR gate being connected to the output of the first NOR gate, the second input of the third NOR gate being connected to the logic-pulse output of the second diode-rectifier/trigger circuit, the third input of the third NOR gate being connected to the $\bar{Q}$ output of the first flip-flop, the fourth input of the third NOR gate being connected to the output of the fourth NOR gate, the first input of the fourth NOR gate being connected to the output of the second NOR gate, the second input of the fourth NOR gate being connected to the logic-pulse output of the first diode-rectifier/trigger circuit, the third input of the fourth NOR gate being connected to the Q output of the second flip-flop, the fourth input of the fourth NOR gate being connected to the output of the third NOR gate, the second input of the first NOR gate being connected to the output of the third NOR gate, and the second input of the second NOR gate being connected to the output of the fourth NOR gate; and (g) a first and second differentiator/monostable multivibrator, each differentiator/monostable multivibrator having an input and an output, the input of the first differentiator/monostable multivibrator being connected to the output of the third NOR gate, the input of the second differentiator/monostable multivibrator being connected to the output of the fourth NOR gate, the output of one of the differentiator/monostable multivibrators defining the forward-increment output terminal of the program-decoding means, and the output of the other differentiator/monostable multivibrator defining the reverse-increment output terminal of the program-decoding means.

4. A process for controlling a numerically-controlled form-cutting machine having two drive motors, an X-direction drive motor for moving a cutting tool in an X direction and a Y-direction drive motor for moving the cutting tool in a Y direction, the process comprising the steps of:

(a) preparing a magnetic-tape recording of a control program by:

(a.1) recording a first sequence of pulsed signals on a first track of a length of magnetic tape, each pulsed signal in the sequence corresponding to an increment of position of the cutting tool in the X-direction;

(a.2) recording a first supplementary sequence of pulsed audio-frequency signals on the first track of the length of magnetic tape superimposed on the first sequence of pulsed signals, each pulsed audio-frequency signal in the first supplementary sequence being coordinated with a pulsed signal of the first sequence and specifying the sign of the increment of position of the cutting tool;

(a.3) recording a second sequence of pulsed signals on a second track of the length of magnetic tape, each pulsed signal in the sequence corresponding to an increment of position of the cutting tool in the Y-direction; and (a.4) recording a second supplementary sequence of pulsed audio-frequency signals on the second track of the length of magnetic tape superimposed on the second sequence of pulsed signals, each pulsed audio-frequency signal in the second supplementary sequence being coordinated with a pulsed signal of the second sequence and specifying the sign of the increment of position of the cutting tool; and (b) subsequently playing back the magnetic tape recording, decoding the first sequence of pulsed signals and the first supplementary sequence of pulsed audio-frequency signals to specify numerically the motion of the cutting tool in the X direction and decoding the second sequence of pulsed signals and the second supplementary sequence of pulsed audio-frequency signals to specify numerically the motion of the cutting tool in the Y direction.

5. A process for controlling a numerically-controlled form-cutting machine having two drive motors, an X-direction drive motor for moving a cutting tool in an X direction and a Y-direction drive motor for moving the cutting tool in a Y direction, the process comprising the steps of:

(a) preparing a magnetic-tape recording of a control program by:

(a.1) recording a first sequence of pulsed signals on a first track of a length of magnetic tape, each pulsed signal in the sequence corresponding to an increment of position of the cutting tool in the X-direction;

(a.2) recording a first supplementary sequence of pulsed audio-frequency signals on a third track of the length of magnetic tape, each pulsed audio-frequency signal in the first supplementary sequence being coordinated with a pulsed signal of the first sequence and specifying the sign of the increment of position of the cutting tool;

(a.3) recording a second sequence of pulsed signals on a second track of the length of magnetic tape, each pulsed signal in the sequence corresponding to an increment of position of the cutting tool in the Y-direction; and (a.4) recording a second supplementary sequence of pulsed audio-frequency signals on the third track of the length of magnetic tape, each pulsed audio-frequency signal in the second supplementary sequency being coordinated with a pulsed signal of the second sequence and specifying the sign of the increment of position of the cutting tool; and (b) subsequently playing back the magnetic tape recording, decoding the first sequence of pulsed signals and the first supplementary sequence of pulsed audio-frequence signals to specify numerically and motion of the cutting tool in the X direction and decoding the second sequence of pulsed signals and the second supplementary sequence of pulsed audio-frequency signals to specify numerically the motion of the cutting tool in the Y direction.

* * * * *

UNITED STATES PATENT AND TRADEMARK OFFICE
CERTIFICATE OF CORRECTION

PATENT NO. : 4,145,723
DATED : March 20, 1979
INVENTOR(S) : Horst Mucha et al.

Figure 2:
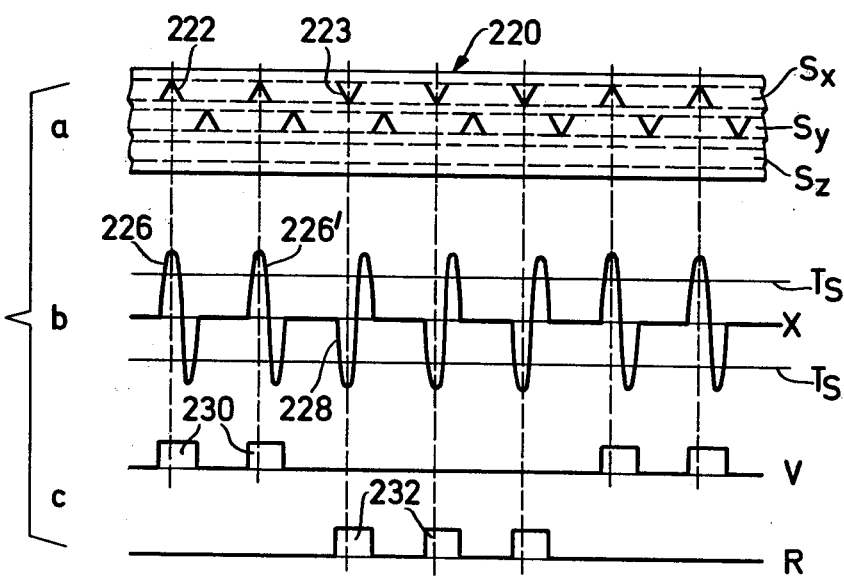
FIG. 2, consisting of A through C, is a schematic diagram of certain signal forms employed in the circuit of FIG. 1.

It is certified that error appears in the above-identified patent and that said Letters Patent are hereby corrected as shown below:

Column 1, line 15, "motion the" should be -- motion in the --;

Column 2, line 58, "Fig. 1, consisting of A and B," should be -- Fig. 1 is a --;

Column 2, line 63, "Fig. 2, consisting of A through C," should be -- Fig. 2 is a schematic --;

Column 9, line 50, "Q output" should be -- $\bar{Q}$ output --;

Column 12, lines 6 and 7, "and motion" should be -- the motion --

Signed and Sealed this

Twenty-sixth Day of June 1979

[SEAL]

Attest:

RUTH C. MASON
Attesting Officer

DONALD W. BANNER
Commissioner of Patents and Trademarks